(12) United States Patent
Arata et al.

(10) Patent No.: US 8,619,377 B2
(45) Date of Patent: Dec. 31, 2013

(54) IMMERSION LENS HOLDING DEVICE

(75) Inventors: Ikuo Arata, Hamamatsu (JP); Hirotoshi Terada, Hamamatsu (JP); Toshimichi Ishizuka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/375,496

(22) PCT Filed: May 28, 2010

(86) PCT No.: PCT/JP2010/059120
§ 371 (c)(1),
(2), (4) Date: Jan. 31, 2012

(87) PCT Pub. No.: WO2010/140552
PCT Pub. Date: Dec. 9, 2010

(65) Prior Publication Data
US 2012/0113534 A1  May 10, 2012

(30) Foreign Application Priority Data
Jun. 3, 2009  (JP) ............................... P2009-134150

(51) Int. Cl.
*G02B 7/02* (2006.01)
(52) U.S. Cl.
USPC .......................................... 359/819; 359/811
(58) Field of Classification Search
USPC ......... 359/809, 811–814, 819, 820–823, 825, 359/827, 829, 830, 656, 661
See application file for complete search history.

(56) References Cited

U.S. PATENT DOCUMENTS

| | | | |
|---|---|---|---|
| 7,046,449 B2 | 5/2006 | Arata et al. | |
| 7,110,172 B2 | 9/2006 | Terada et al. | |
| 7,221,502 B2 | 5/2007 | Terada et al. | |
| 7,312,921 B2 | 12/2007 | Terada et al. | |
| 7,359,115 B2 | 4/2008 | Arata et al. | |
| 7,414,800 B2 | 8/2008 | Isobe et al. | |
| 7,423,816 B2 | 9/2008 | Terada et al. | |
| 2003/0231400 A1 | 12/2003 | Frosig et al. | |
| 2005/0094258 A1 | 5/2005 | Tanabe et al. | |
| 2006/0176548 A1* | 8/2006 | Terada et al. | 359/368 |

FOREIGN PATENT DOCUMENTS

| | | |
|---|---|---|
| JP | 62-184414 | 8/1987 |
| JP | 2006-201407 | 8/2006 |
| JP | 2006-227565 | 8/2006 |
| JP | 2009-3133 | 1/2009 |
| WO | 2005/043210 | 5/2005 |
| WO | WO 2005/083490 | 9/2005 |

\* cited by examiner

*Primary Examiner* — Ricky Mack
*Assistant Examiner* — Gary O'Neill
(74) *Attorney, Agent, or Firm* — Drinker Biddle & Reath LLP

(57) ABSTRACT

A solid immersion lens supporting device includes a lens holder 30 that holds a solid immersion lens 20 in a free state in which a lens bottom surface 22 protrudes downward through a lower opening 32 so as not to fix the solid immersion lens, and a lens cover 40 which is provided to an upper opening 31 of the lens holder 30, and in which a cover bottom surface 42 on the solid immersion lens 20 side is on a plane perpendicular to an optical axis, the lens cover coming into one-point contact with a spherical lens top surface 21 of the solid immersion lens 20. Further, the lens cover 40 is provided with a positioning portion which is capable of carrying out positioning of the solid immersion lens 20 with respect to the objective lens with reference to an image of the lens cover 40 observed via the objective lens. Thereby, the immersion lens supporting device which is capable of efficiently carrying out movement, installation, and positioning of the immersion lens onto a sample is realized.

9 Claims, 18 Drawing Sheets

*Fig.3*
(a)
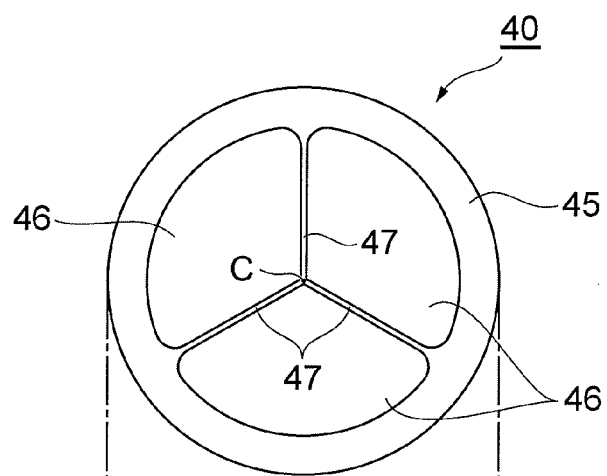
(b)
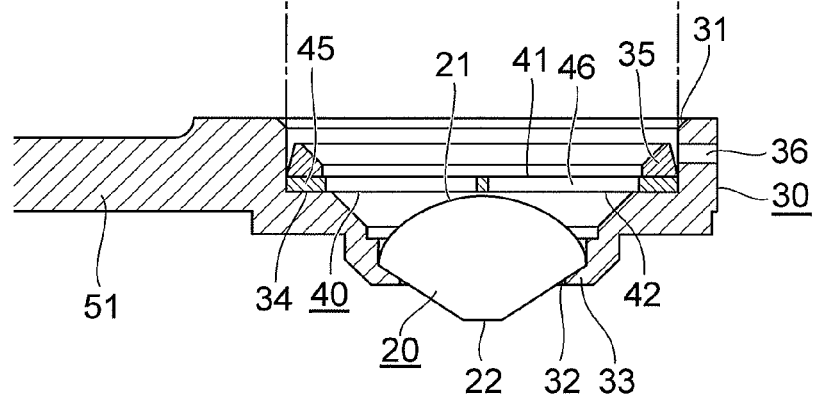

Fig.5
(a)
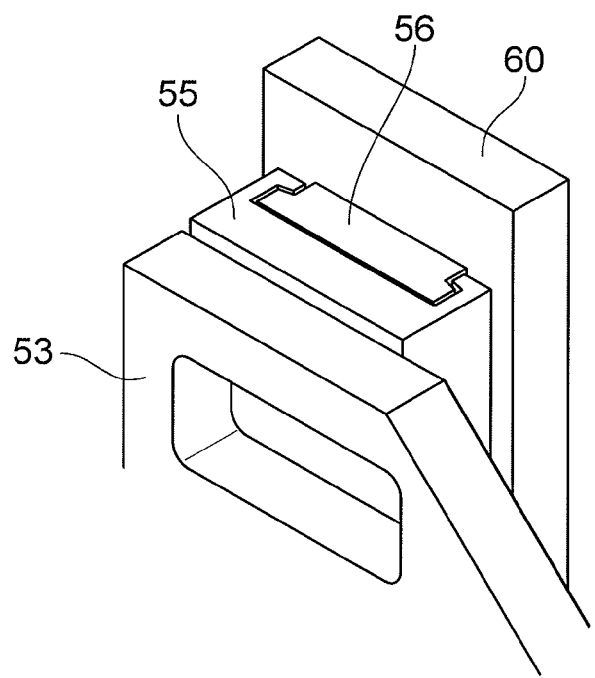
(b)
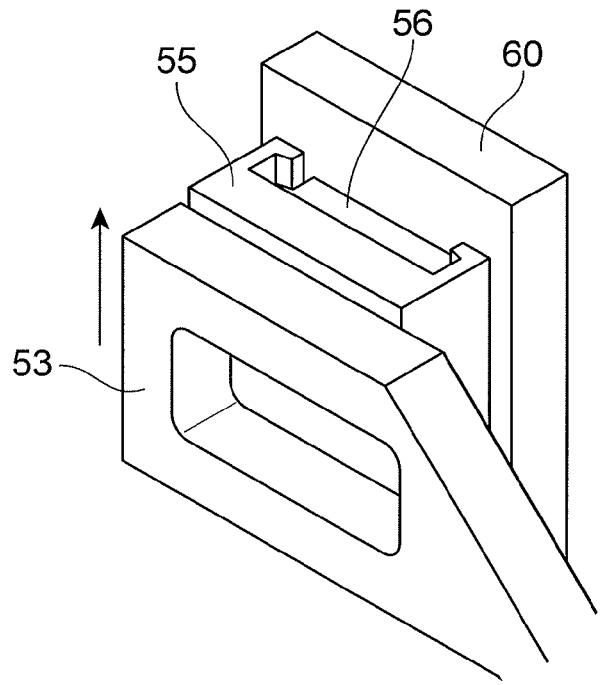

Fig.6
(a)
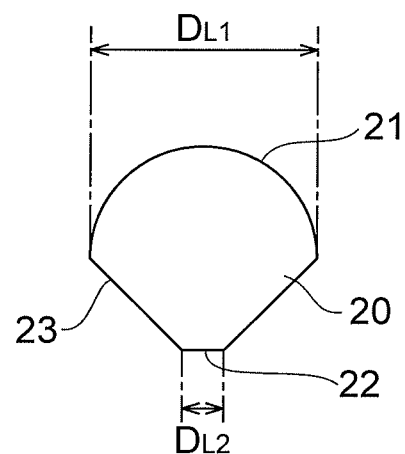
(b)
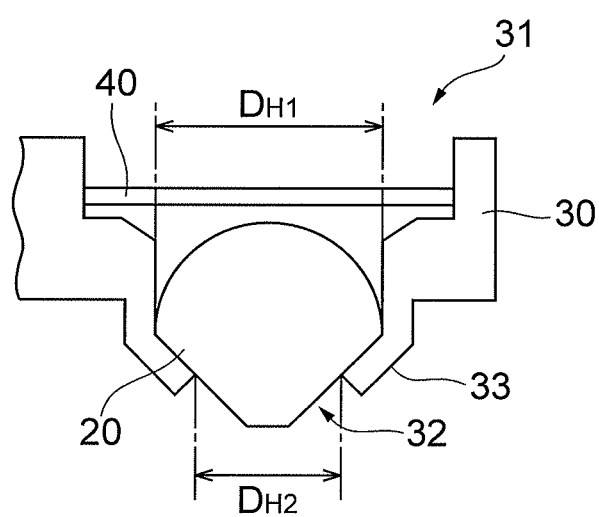

Fig.7
(a)
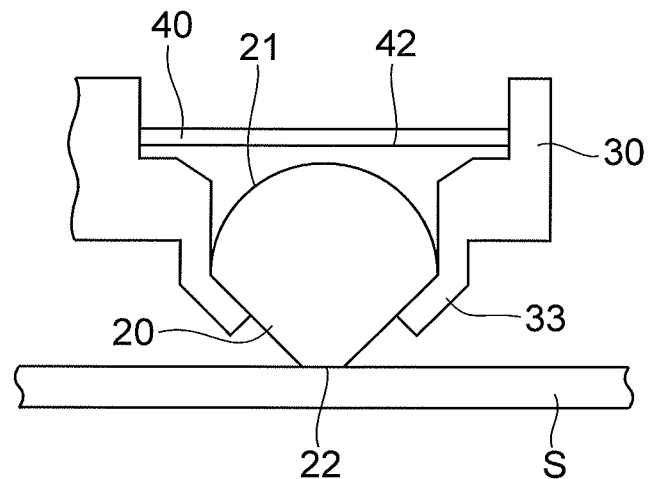
(b)
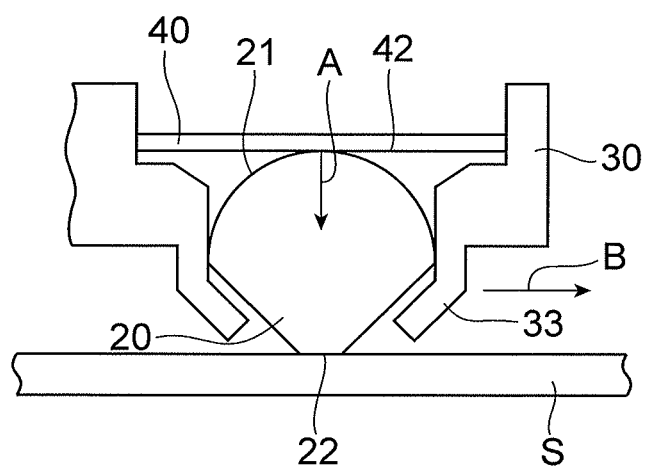

Fig.9
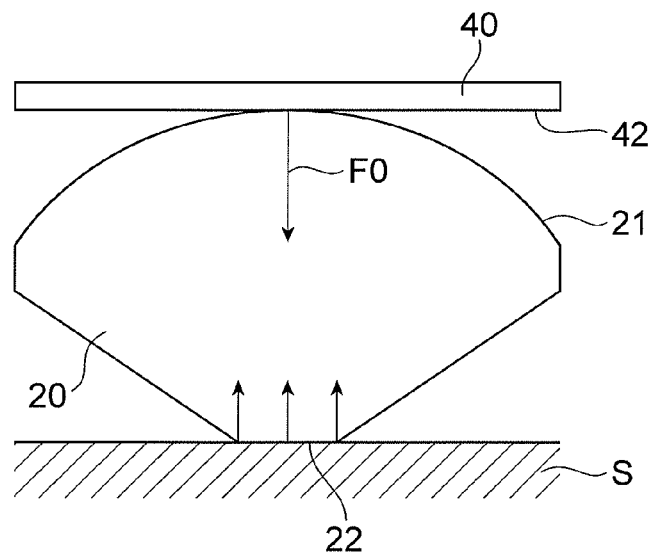
(a)
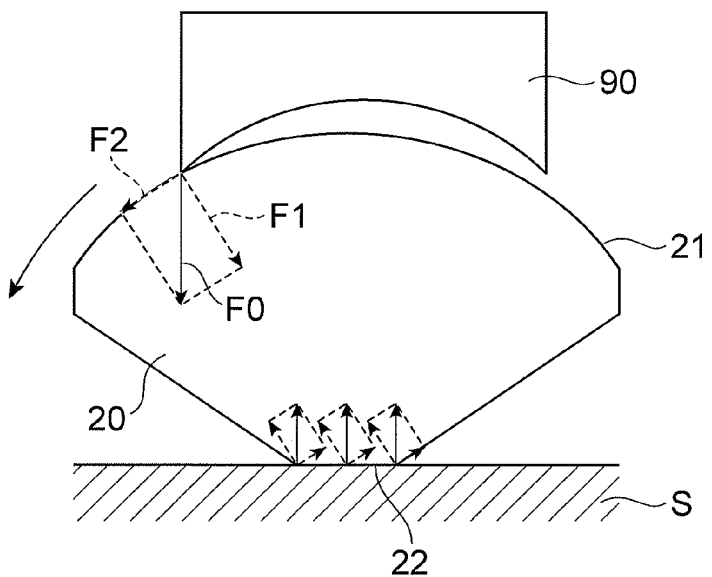
(b)

Fig.13
(a)
(b)

*Fig.14*
(a)
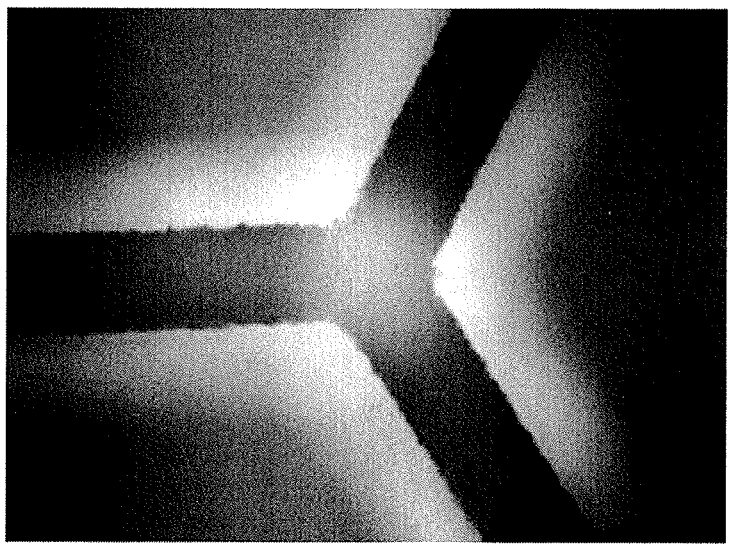
(b)
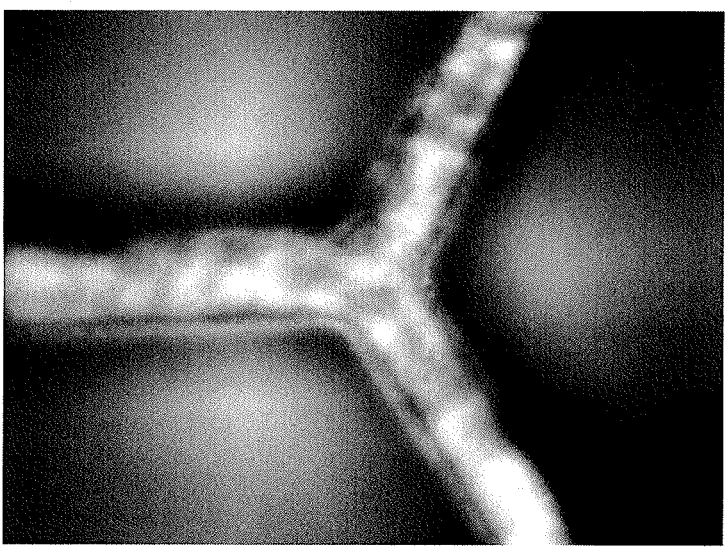

*Fig.16*
(a)
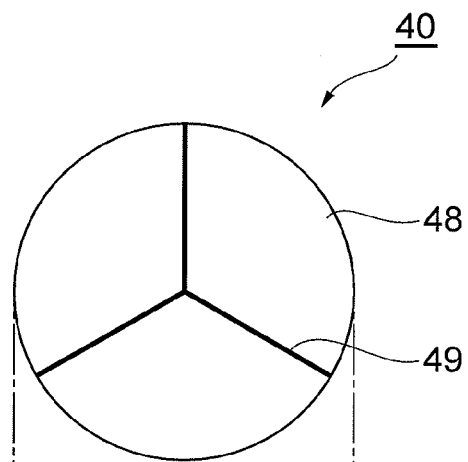
(b)
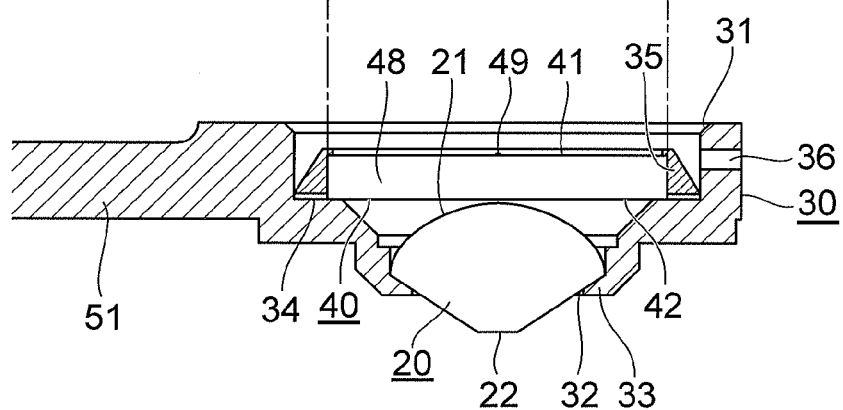

Fig.18
(a)
(b)
(c)
(d)
(e)
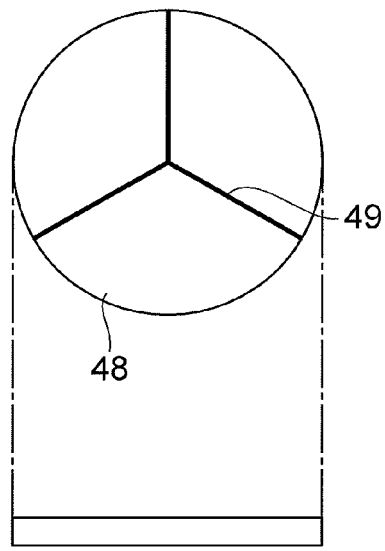
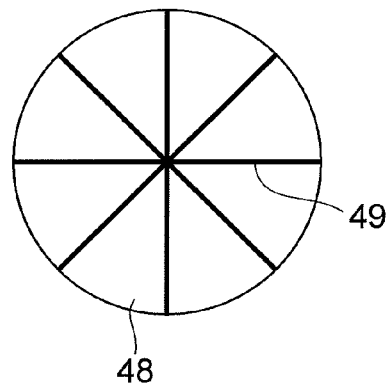
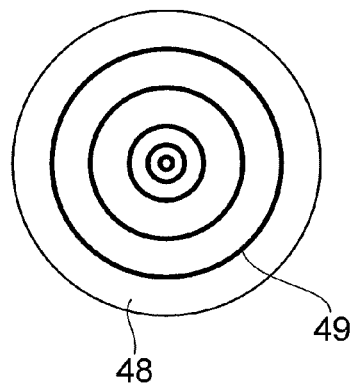
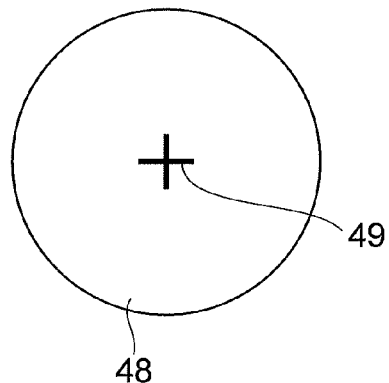

IMMERSION LENS HOLDING DEVICE

TECHNICAL FIELD

The present invention relates to a lens supporting device that supports an immersion lens such as a solid immersion lens or a liquid immersion lens movably.

BACKGROUND ART

As a lens that magnifies an image of a sample serving as an observation object, a solid immersion lens (SIL: Solid Immersion Lens) is known. A solid immersion lens has a predetermined shape such as a hemispherical shape or a hyperhemispherical shape called a Weierstrass sphere, that is a microlens of approximately 1 mm to 5 mm in size. Then, provided that the solid immersion lens is installed so as to be put in close contact with the surface of a sample, its numerical aperture (NA) and magnification are both increased, which enables an observation of the sample with high spatial resolution.

As a solid immersion lens holder that holds such a solid immersion lens, for example, solid immersion lens holders disclosed in Patent Documents 1 to 3 are known. The solid immersion lens holder disclosed in Patent Document 1 is configured to support a solid immersion lens in the gravity direction in a state in which the bottom surface of the solid immersion lens protrudes downward through an opening. Further, in Patent Document 2, there is disclosed the holder having a lens holding portion that holds a solid immersion lens which is not fixed to be in a free state. Further, in Patent Document 3, there is disclosed the configuration in which a solid immersion lens holder is disposed in front of an objective lens.

CITATION LIST

Patent Literature

Patent Document 1: International Publication WO 2005/043210 Pamphlet
Patent Document 2: Japanese Patent Application Laid-Open No. 2009-3133
Patent Document 3: Japanese Patent Application Laid-Open No. 2006-227565

SUMMARY OF INVENTION

Technical Problem

Among the above-described configurations, in the configurations disclosed in Patent Documents 2 and 3, because the solid immersion lens holder is attached to the objective lens, it is impossible to independently move the solid immersion lens with respect to the objective lens in a direction perpendicular to an optical axis of the objective lens. In contrast thereto, in the configuration disclosed in Patent Document 1, it is possible to independently move the solid immersion lens with respect to the objective lens by a solid immersion lens manipulator. However, in the solid immersion lens holder in Patent Document 1, there is a problem that it is difficult to accurately and efficiently carry out movement and installation of the solid immersion lens onto a sample, and positioning of the solid immersion lens with respect to the objective lens. Such a problem is generally caused in a case where an immersion lens such as a solid immersion lens or a liquid immersion lens is applied to a microscope including an objective lens.

The present invention has been made in order to solve the above-described problem, and an object of the present invention is to provide an immersion lens supporting device which is capable of appropriately carrying out movement and installation of an immersion lens onto a sample, and positioning of the immersion lens with respect to an objective lens.

Solution to Problem

In order to achieve the object described above, an immersion lens supporting device according to the present invention is a supporting device for supporting an immersion lens movably in a direction perpendicular to an optical axis of an objective lens between the objective lens and a sample of an observation object, the supporting device including (1) a lens holder holding the immersion lens in a free state in which a lens bottom surface protrudes downward through a lower opening so as not to fix the immersion lens, and (2) a lens cover which is provided to an upper opening of the lens holder, and in which a cover bottom surface on the immersion lens side is on a plane perpendicular to the optical axis, the lens cover coming into one-point contact with a spherical lens top surface of the immersion lens, wherein (3) the lens cover is provided with a positioning portion which is capable of carrying out positioning of the immersion lens with respect to the objective lens, with reference to an image of the lens cover observed via the objective lens.

In the immersion lens supporting device described above, the supporting device, that supports the immersion lens such as a solid immersion lens movably in a direction perpendicular to the optical axis of the objective lens, is configured by using the lens holder that holds the immersion lens in a free state, and the lens cover provided for the upper opening of the lens holder. Then, the lens cover is configured such that the cover bottom surface on the immersion lens side becomes a plane perpendicular to the optical axis.

In such a configuration, the spherical lens top surface of the immersion lens held in a space sandwiched between the lens holder and the lens cover of the supporting device comes into one-point contact with the planar cover bottom surface. In this case, it is easy for the immersion lens in contact with the lens cover to freely move with respect to the cover. As a result, it is easy for the immersion lens to follow along the sample, and therefore, it is possible to cause the bottom surface of the immersion lens and the sample to preferably come into close contact with one another.

Moreover, in such a configuration, the lens cover located above the immersion lens is provided with a positioning portion having a predetermined pattern which is capable of carrying out positioning by observing an image of the lens cover via the objective lens. Thereby, it is possible to accurately and efficiently perform positioning between the objective lens and the immersion lens supported by the supporting device including the lens cover with reference to an image of the lens cover. As described above, the lens supporting device which is capable of appropriately carrying out movement and installation of the immersion lens onto the sample and positioning of the immersion lens with respect to the objective lens is realized.

Advantageous Effects of Invention

In accordance with the immersion lens supporting device of the present invention, the supporting device that supports an immersion lens is configured by using the lens holder that holds the lens in a free state, and the lens cover provided to the upper opening of the lens holder, and the lens cover is configured such that the cover bottom surface on the immersion lens side becomes a plane perpendicular to the optical axis, and the lens top surface and the cover bottom surface are brought into one-point contact with each other, and the lens cover is provided with the positioning portion which is capable of carrying out positioning by observing an image of the lens cover via the objective lens, and thereby, it is possible to appropriately perform movement, installation, and positioning of the immersion lens onto the sample.

BRIEF DESCRIPTION OF DRAWINGS

FIG. 3 is a figure including (a) a top view and (b) a side cross-sectional view enlargedly showing a configuration of a lens holder and a lens cover in the solid immersion lens supporting device.

FIG. 5 is a figure including perspective views showing a connecting configuration between an arm part and a lens moving device in the solid immersion lens supporting device.

FIG. 6 is a figure including diagrams schematically showing a solid immersion lens, a lens holder that holds the solid immersion lens, and a lens cover.

FIG. 7 is a figure including diagrams schematically showing the solid immersion lens, the lens holder that holds the solid immersion lens, and the lens cover.

FIG. 9 is a figure including diagrams showing point contact between the solid immersion lens and the lens cover.

FIG. 13 is a figure including diagrams showing examples of optical images observed via an objective lens.

FIG. 14 is a figure including diagrams showing examples of optical images observed via the objective lens.

FIG. 16 is a figure including (a) a top view and (b) a side cross-sectional view showing another example of a configuration of a lens holder and a lens cover in the solid immersion lens supporting device.

FIG. 18 is a figure including diagrams showing modified examples of a configuration of the lens cover shown in FIG. 16.

DESCRIPTION OF EMBODIMENTS

Figure 1:
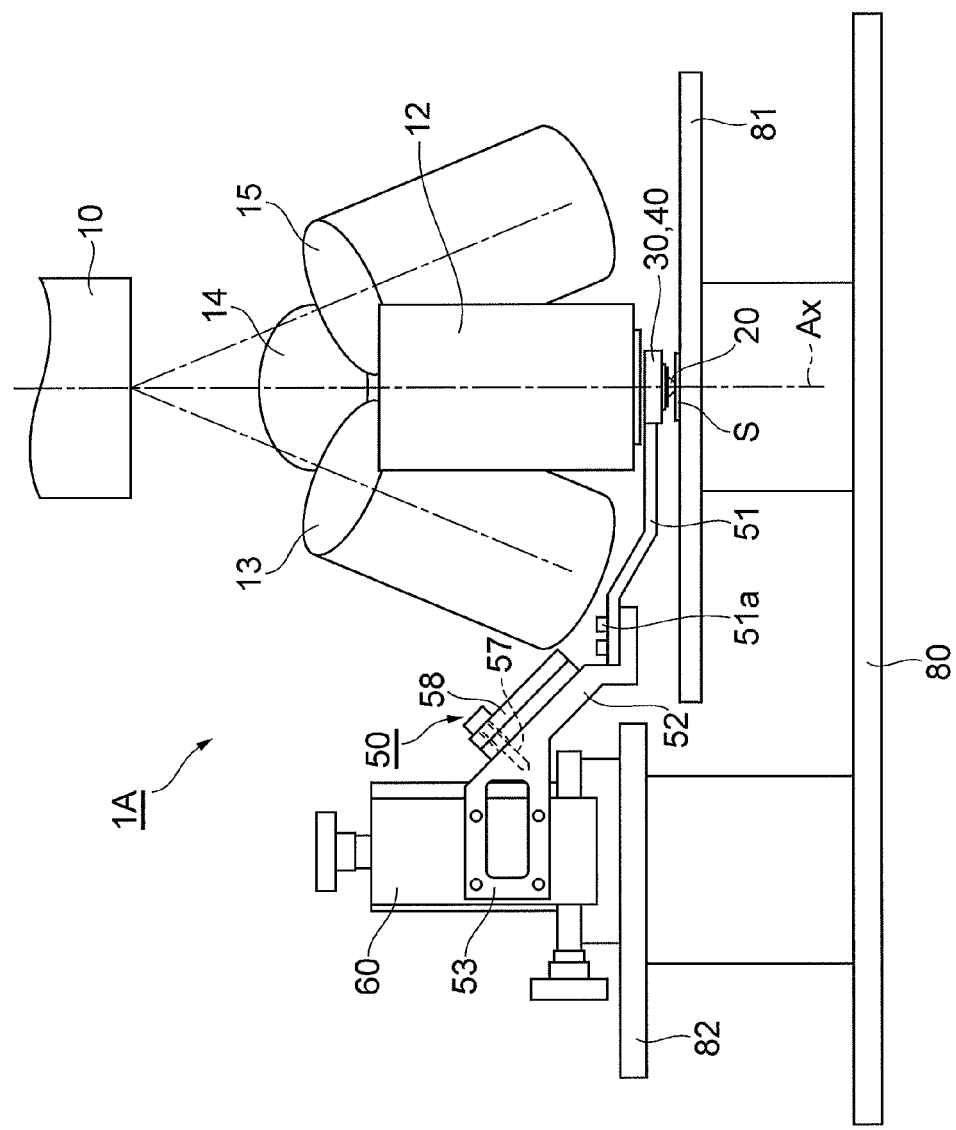
FIG. 1 is a side view showing a configuration of an embodiment of a microscope system equipped with a solid immersion lens and a solid immersion lens supporting device.

Hereinafter, preferred embodiments of an immersion lens supporting device according to the present invention will be described in detail with reference to the accompanying drawings. In addition, in the description of the drawings, the same components are denoted by the same reference symbols, and overlapping descriptions will be omitted. Further, the dimensional ratios in the drawings are not necessarily matched to those in the description.

Further, the following description of a configuration of the solid immersion lens supporting device will be given assuming that an immersion lens is a solid immersion lens in the immersion lens supporting device according to the present invention. However, the supporting device according to the present invention is applicable generally as a lens supporting device that supports an immersion lens such as a solid immersion lens or a liquid immersion lens.

Figure 2:
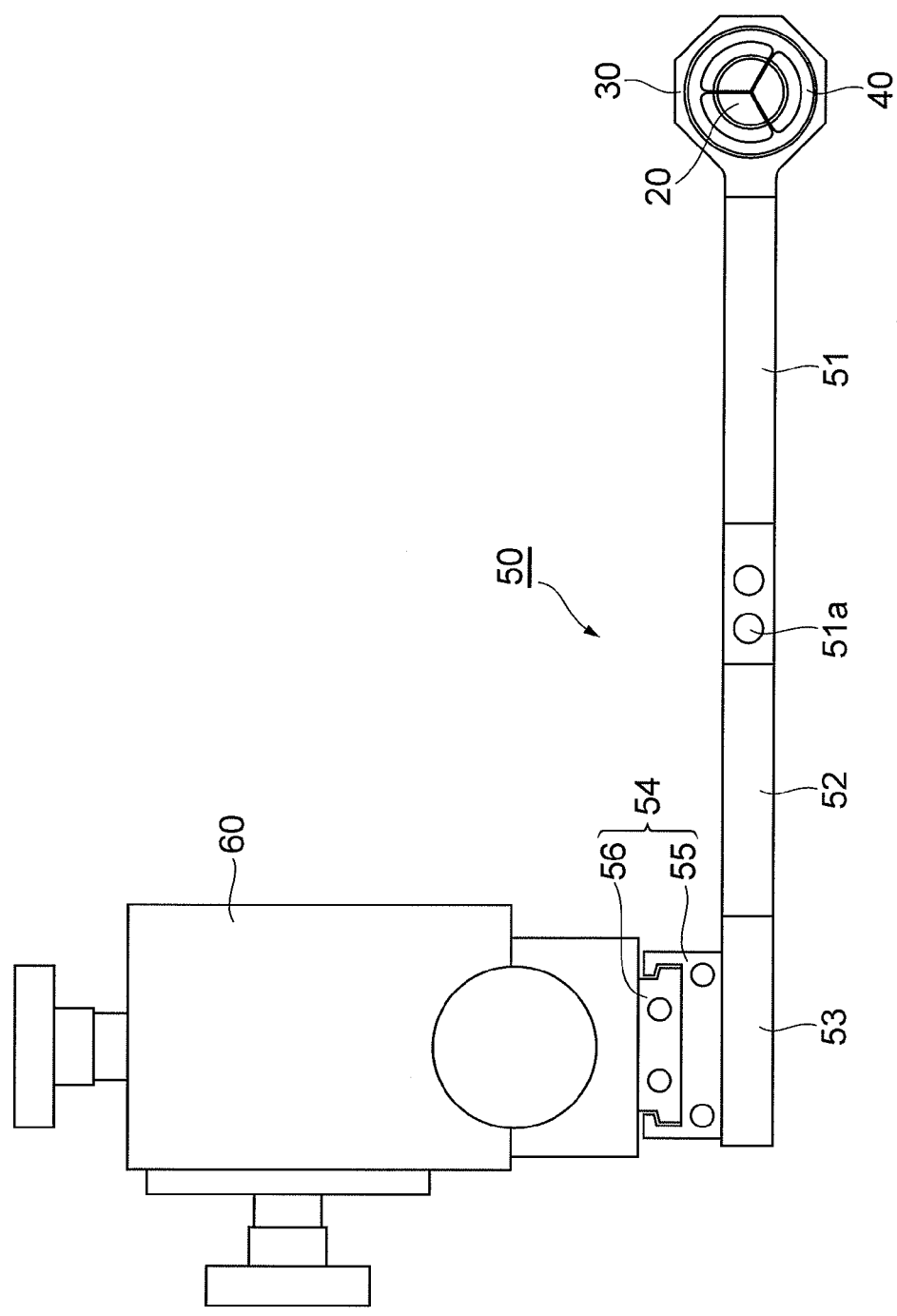
FIG. 2 is a top view showing a configuration of the solid immersion lens supporting device shown in FIG. 1.

FIG. 1 is a side view showing a configuration of an embodiment of a microscope system equipped with a solid immersion lens and a solid immersion lens supporting device according to the present invention. Further, FIG. 2 is a top view showing a configuration of the solid immersion lens supporting device in the microscope system shown in FIG. 1. Here, for convenience of explanation, the following descriptions will be given such that an objective lens 12 side is set as an upper side and a sample S side is set as a lower side with respect to an optical axis between the objective lens 12 and the sample S.

A microscope system 1A according to the present embodiment includes a microscope optical system 10, an objective lens 12, a solid immersion lens 20, and a solid immersion lens supporting device 50. The microscope optical system 10 is composed of, for example, a light guiding optical system that guides light from the sample S, and the like, however, the illustration of its detailed configuration is omitted in FIG. 1. Further, in this configuration example, the objective lens 12 is configured to switch, by a revolver, a plurality of objective lenses different from each other in magnifications as schematically shown by objective lenses 12 to 15. Further, a first support mount 81 for placing the sample S serving as an observation object thereon is provided below the microscope optical system 10 and the objective lens 12.

For adjustment of an observation position and focus adjustment for the sample S by the objective lens 12, for example, a configuration in which an XYZ stage is provided for the objective lens 12 to carry out a movement in the horizontal direction (X-axis direction and Y-axis direction) for adjustment of an observation position and a movement in the vertical direction (Z-axis direction) for focus adjustment may be used. Further, a configuration in which an XY stage is provided for the sample S, and a Z stage is provided for the objective lens 12 may be used, or a configuration in which an XYZ stage is provided for the sample S may be used.

The solid immersion lens (SIL) 20 is installed between the objective lens 12 and the sample S. The solid immersion lens 20 is a lens having a predetermined shape such as a hemispherical shape or a hyperhemispherical shape, and is used in a state in which it is made to come into optically close contact with the surface of the sample S. In this way, by using the solid immersion lens 20, it is possible to achieve an NA equal to or greater than 1, which cannot be achieved in normal observation.

Here, in observation of the sample S using the solid immersion lens 20, an observation method in which an NA is increased due to evanescent light leaking out may be used for the sample S with a high surface accuracy. In this case, it is possible to achieve an NA of 2.5 which is restricted by NA of the objective lens 12. Further, even for the sample S with a low surface accuracy, by providing a liquid (for example, a liquid with a refractive index of 1.5) at the boundary surface between the solid immersion lens and the sample, it is possible to observe the sample at an NA corresponding to the refractive index of the liquid.

In the microscope system 1A according to the present embodiment, the solid immersion lens 20 is, as shown in FIG. 1 and FIG. 2, supported between the objective lens 12 and the sample S by the solid immersion lens supporting device (solid immersion lens manipulator) 50 that supports the solid immersion lens 20 movably in a direction perpendicular to an optical axis Ax of the objective lens 12.

Figure 4:
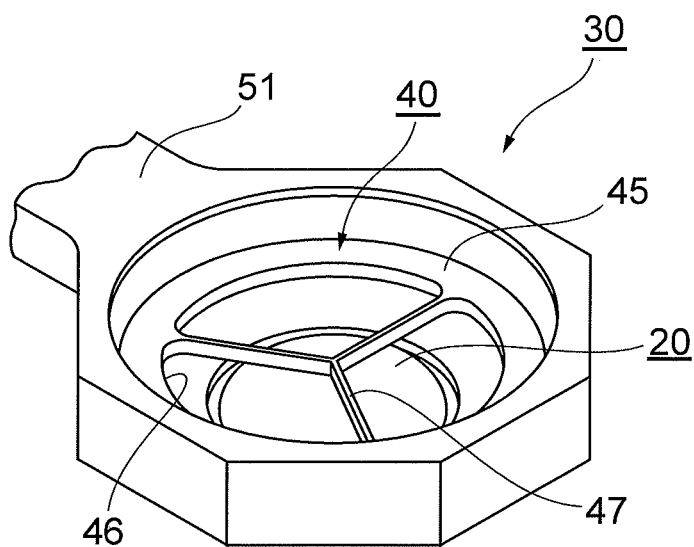
FIG. 4 is a perspective view enlargedly showing the configuration of the lens holder and the lens cover in the solid immersion lens supporting device.

The solid immersion lens supporting device 50 includes a lens holder 30, a lens cover 40, a first arm part 51, and a second arm part 52. Here, FIG. 3 is a figure including (a) a top view and (b) a side cross-sectional view enlargedly showing a configuration of the lens holder 30 and the lens cover 40 in the solid immersion lens supporting device 50. Further, FIG. 4 is a perspective view enlargedly showing the configuration of the lens holder 30 and the lens cover 40.

In addition, in FIG. 3, (a) in FIG. 3 shows the planar structure of only the lens cover 40 in the solid immersion lens supporting device 50. Further, (b) in FIG. 3 shows the structures of the lens holder 30 and the lens cover 40 and the structure of the solid immersion lens 20 supported by those together.

The solid immersion lens 20 in the present embodiment has a spherical lens top surface (a surface on the objective lens 12 side) 21 and a substantially planar lens bottom surface (a surface on the sample S side) 22. When the sample S is observed by using the objective lens 12 and the solid immersion lens 20, as shown in FIG. 1, the observation is carried out in a state in which the lens bottom surface 22 is put in optically close contact with the surface of the sample S.

For the solid immersion lens 20, the lens holder 30 is formed into a substantially cylindrical shape which is capable of containing the solid immersion lens 20 inside with a direction along the optical axis of the objective lens 12 as a central axis. An annular protruding portion 33 that annularly protrudes inward is provided at a lower opening 32 in the lower end portion of the lens holder 30. The solid immersion lens 20 is held by the lens holder 30 in a free state in which it is not fixed such that the peripheral portion of the lens 20 is placed on the annular protruding portion 33 and the lens bottom surface 22 protrudes downward through the lower opening 32.

Further, the lens holder 30 is set such that an inner diameter of an upper opening 31 at its upper end portion and on the opposite side to the opening 32 is larger than an outer diameter of the solid immersion lens 20. Thereby, the lens holder 30 is configured to be able to contain the solid immersion lens 20 inside the holder 30 from the upper opening 31. Further, for the upper opening 31 of the lens holder 30, the lens cover 40 having a predetermined shape is provided so as to cover the opening 31.

The lens cover 40 is configured such that a cover bottom surface 42 on the solid immersion lens 20 side is on a plane perpendicular to the optical axis (the central axis of the lens holder 30), and the cover bottom surface 42 comes into one-point contact with the lens top surface 21 of the solid immersion lens 20 preferably at a central point C of the lens cover 40 or in the vicinity thereof. Further, with the configuration of FIG. 3, a cover top surface 41 as well is on a plane parallel to the bottom surface 42, thereby making the lens cover 40 become a flat plate-shaped member which is uniform in thickness.

In detail, the lens cover 40 is configured by an annular portion 45 composing its peripheral portion, three bar-shaped portions 47 extending radially to the outer annular portion 45 from the central point C of the lens cover 40, and three opening portions 46 partitioned by the annular portion 45 and the bar-shaped portions 47. Further, the three bar-shaped portions 47 are provided at even angular intervals (at intervals of 120°) when viewed from the central point C. These bar-shaped portions 47 are formed as a pattern including the central point C of the lens cover 40, thereby configuring a lens holding portion which comes into one-point contact with the lens top surface 21 to hold the solid immersion lens 20 between the holder 30 and the cover 40. Further, the three opening portions 46 configure a light passage portion allowing passage of light between the objective lens 12 and the solid immersion lens 20.

In addition, the lens holding portion including the three bar-shaped portions 47 further has a function as a positioning portion which is capable of carrying out positioning of the solid immersion lens 20 with respect to the objective lens 12, with reference to an image of the lens cover 40 observed via the objective lens 12. Further, the positioning portion in the lens cover 40 which is composed of the bar-shaped portions 47 in such a configuration is formed into a 3-fold rotationally symmetrical pattern centering on the central point C of the lens cover 40 with respect to a plane perpendicular to the optical axis.

For the lens cover 40, an annular step portion 34 whose inner diameter is increased in a step-like manner from the lower opening 32 side toward the upper opening 31 side is provided at a position of the lens holder 30 higher to some extent than the upper end portion of the lens 20 in a state in which the solid immersion lens 20 is in contact with the annular protruding portion 33. The upper surface of the annular step portion 34 is a surface perpendicular to the optical axis, and the lens cover 40 is placed on the upper surface of the step portion 34.

Further, in the configuration example shown in FIG. 3, an annular fixing member 35 is disposed further above the lens cover 40 placed on the step portion 34. Further, a screw hole 36 is provided at a predetermined position in the side wall of the lens holder 30 between the annular step portion 34 and the upper opening 31. In this configuration, the fixing member 35 is pressed against the lens cover 40 by a screw protruding inward from the screw hole 36, thereby fixing the lens cover 40 onto the annular step portion 34 of the holder 30. Here, in the perspective view of FIG. 4, the illustration of the fixing member 35 and the like is omitted. Further, for fixing the lens cover 40, in detail, various configurations such as a configuration in which the lens cover 40 and the annular step portion 34 of the holder 30 are bonded with an adhesive or the like to be fixed may be used.

In the solid immersion lens supporting device 50 shown in FIG. 1 and FIG. 2, in addition to the lens holder 30 and the lens cover 40 described above, an arm part extending outward from the lens holder 30 is further provided. The arm part is connected to a lens moving device 60 which is for moving the solid immersion lens 20 in a direction perpendicular to the optical axis Ax (horizontal direction) of the objective lens 12 independently with respect to the objective lens 12. Further, the moving device 60 is configured to be able to move the solid immersion lens 20 in a direction along the optical axis Ax (vertical direction).

As the lens moving device 60, for example, the XYZ stage which is capable of moving the arm part connected to the moving device 60, the lens holder 30 and the lens cover 40 integrally fixed to the arm part, and the solid immersion lens 20 held by the holder 30 and the cover 40 in the X-axis direction and the Y-axis direction (horizontal direction), and in the Z-axis direction (vertical direction) is suitably used.

The moving device 60 is installed on a second support mount 82, and the support mount 82 and the support mount 81 on which the sample S is mounted are further supported as a whole by a support mount 80. In addition, these support mounts 80 to 82 are shown so as to simplify their configurations in FIG. 1.

In the present embodiment, the arm part is configured by a first arm part 51 composing a portion on the lens holder 30 side thereof, and a second arm part 52 composing a portion on the moving device 60 side. The first arm part 51 is formed into a shape which extends outward from the outer wall of the lens holder 30, and further extends obliquely upward. Further, the first arm part 51 is provided integrally with the lens holder 30.

The second arm part 52 is formed into a shape which extends obliquely upward from the rear end portion of the first arm part 51. The second arm part 52 is fixed to the rear end portion of the first arm part 51 at its front end portion by a fixing screw 51a. Thereby, the first and second arm parts 51 and 52 are made attachable and detachable with the screw 51a, that is configured to be able to detach the portion including the holder 30 and the first arm part 51 by which the solid immersion lens 20 is held from the supporting device 50 including the second arm part 52. Further, the rear end portion of the second arm part 52 serves as a connecting portion 53 connected to the moving device 60.

Further, the connecting portion 53 of the second arm part 52 is, as shown in FIG. 2, connected to the moving device 60 via a linear movement guide (linear guide) 54 which is slidable in a direction along the optical axis Ax. The linear movement guide 54 is, as shown in FIG. 2, configured by a movable table 55 fixed to the connecting portion 53 and a guide main body 56 fixed to the moving device 60. With this, as shown in (a) and (b) in FIG. 5, it is configured such that the movable table 55 slides along the guide main body 56, which makes it possible to move the arm part and the like fixed to the movable table 55 in the up-and-down direction along the optical axis Ax.

Further, as shown in FIG. 1, a weight attaching portion 57 allowing attachment of a weight 58 to the arm part is provided to the second arm part 52. In this configuration example, the weight attaching portion 57 is configured to attach the weight 58 onto the upper surface of the second arm part 52 by screwing. In addition, the illustration of the weight attaching portion 57 and the like is omitted in FIG. 2.

The effect of the solid immersion lens supporting device 50 according to the present embodiment will be described.

In the solid immersion lens supporting device 50 shown in FIG. 1 to FIG. 5, the supporting device 50, that supports the solid immersion lens 20 movably in a direction perpendicular to the optical axis Ax of the objective lens 12, is configured by using the lens holder 30 holding the solid immersion lens 20 in a free state, and the lens cover 40 provided for the upper opening 31 of the lens holder 30. Then, the lens cover 40 is configured such that the cover bottom surface 42 on the solid immersion lens 20 side becomes a planar plane perpendicular to the optical axis.

In such a configuration, the solid immersion lens 20 is held in a space sandwiched between the lens holder 30 and the lens cover 40 of the supporting device 50, and the spherical lens top surface 21 of the solid immersion lens 20 comes into one-point contact with the planar cover bottom surface 42. In this case, it is easy for the solid immersion lens 20 in contact with the lens cover 40 to freely move with respect to the cover 40. As a result, when the solid immersion lens 20 is installed onto the sample S, it is easy for the lens 20 to follow along the sample S. Accordingly, it is possible to cause the bottom surface 22 of the solid immersion lens 20 and the sample S to preferably come into close contact with one other.

Moreover, in such a configuration, a positioning portion which is capable of carrying out positioning by observing an image of the lens cover 40 via the objective lens 12 is provided in the lens cover 40 positioned above the solid immersion lens 20. Thereby, it is possible to accurately and efficiently carry out positioning between the objective lens 12 and the solid immersion lens 20 supported by the supporting device 50 including the lens cover 40 with reference to an image of the lens cover 40, in more detail, an image of the positioning portion having a predetermined pattern. As described above, the solid immersion lens supporting device 50 which is capable of appropriately carrying out movement and installation of the solid immersion lens 20 onto the sample S, and positioning of the solid immersion lens 20 with respect to the optical axis of the objective lens 12, and the microscope system 1A equipped with the supporting device 50 are realized.

In such a configuration, because the lens cover 40 is configured to achieve both of a function of holding the solid immersion lens 20 and a function as a positioning portion, as compared with a configuration of achieving those with separate members and the like, it is possible to ensure a broad area as the light passage portion such as the opening portions 46 allowing passage of light, which makes it possible to detect more light from the sample S such as a semiconductor device. Further, in the above-described embodiment, the cover top surface 41 has a planar shape, and the top surface 41 composes the positioning portion. In this case, it is possible to align the entire positioning portion on a focus position by focusing on a part of the positioning portion.

In the supporting device 50 having the above-described configuration, the positioning portion provided in the lens cover 40 is preferably formed into a pattern which is n-fold rotationally symmetrical (n is an integer not less than 2) centering on the central point C of the lens cover 40 with respect to a plane perpendicular to the optical axis Ax. By using the positioning portion having such a symmetrical pattern, it is possible to more accurately and efficiently carry out positioning of the solid immersion lens 20 with an image of the positioning portion. FIG. 3 shows, as an example of the configuration of such a positioning portion, a positioning portion having a 3-fold rotationally symmetrical pattern (spider shape) composed of the three bar-shaped portions 47 extending radially from the central point.

As a specific configuration of the lens cover 40, the configuration in which the lens cover 40 has one or a plurality of opening portions 46 allowing passage of light, and the lens holding portion which is formed into a pattern including the central point C of the lens cover 40, and holds the solid immersion lens 20 between the lens holder 30 and the lens cover 40, and functions as the positioning portion is used in the above-described embodiment. Thereby, it is possible to appropriately realize the lens cover 40 having both of the function of holding the solid immersion lens 20 and the function as a positioning portion. Further, in this case, the lens holding portion preferably has the plurality of bar-shaped portions 47 extending radially and at even intervals from the central point C of the lens cover 40. FIG. 3 shows, as an example of such a configuration, the configuration in which the three opening portions 46 and the lens holding portion which includes the three bar-shaped portions 47 and functions as the positioning portion are provided.

Further, in the supporting device 50 shown in FIG. 1 and FIG. 2, in addition to the lens holder 30 and the lens cover 40, the arm parts 51 and 52 extending outward from the lens holder 30 to be connected to the lens moving device 60 are provided. With such a configuration, it is possible to appropriately hold and move the solid immersion lens 20 between the objective lens 12 and the sample S by using the moving device 60 and the arm parts 51 and 52.

Further, in the above-described embodiment, in the configuration having the arm part including the first and second arm parts 51 and 52, the second arm part 52 is connected to the moving device 60 via the linear movement guide 54 which is slidable in a direction along the optical axis. In such a configuration, as needed, the arm parts 51 and 52 and the lens holder 30 and the lens cover 40 which are fixed to the arm part slide in a direction along the optical axis by the linear movement guide 54. Thereby, force by the movement in a direction along the optical axis by the moving device 60 is not applied to the lens 20 and the sample S when the solid immersion lens 20 is installed onto the sample S, and only force due to their own weight of the lens holder 30, the cover 40, the arm part, and the like is applied to the solid immersion lens 20, which prevents an excess of force from being applied to the lens 20 and the sample S. However, the connecting configuration between the arm part and the moving device 60 may be a configuration in which the arm part is fixedly connected to the moving device 60.

Further, as shown in FIG. 1, the arm parts 51 and 52 may have a configuration in which the weight attaching portion 57 allowing attachment of the weight 58 is provided. In this case, it is possible to adjust the load applied to the lens 20 and the sample S and the close contact between the lens 20 and the sample S due to the load by attachment of the weight 58, when the solid immersion lens 20 is installed onto the sample S. However, a configuration in which the weight attaching portion 57 is not provided if there is no need for it may be used.

Figure 8:
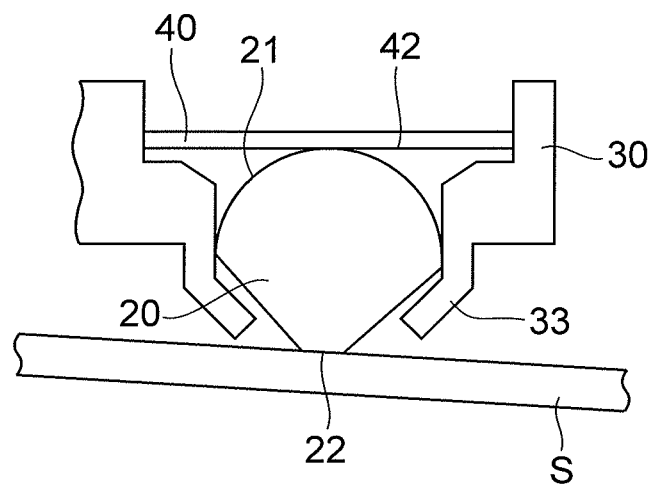
FIG. 8 is a diagram schematically showing the solid immersion lens, the lens holder that holds the solid immersion lens, and the lens cover.

The configuration of the solid immersion lens supporting device 50 with the above-described configuration, and the functions and effects thereof will be described in more detail. FIG. 6 to FIG. 8 are diagrams schematically showing the solid immersion lens 20, the lens holder 30 that holds the solid immersion lens 20, and the lens cover 40. In addition, here, for ease of explanation, the lens cover 40 is illustrated as a flat plate-shaped member.

(a) in FIG. 6 schematically shows the configuration of the solid immersion lens 20. Further, (b) in FIG. 6 shows the configuration of the lens holder 30 that holds the solid immersion lens 20, and the lens cover 40. The solid immersion lens 20 in this configuration example has the spherical lens top surface 21 and the substantially planar lens bottom surface 22. Further, a lens side surface 23 whose outer diameter is decreased so as to be a tapered shape from the top surface 21 side toward the bottom surface 22 side is provided between the lens top surface 21 and the bottom surface 22. This lens side surface 23 is, as shown in (b) in FIG. 6, used for placing the solid immersion lens 20 onto the annular protruding portion 33 of the holder 30.

In the solid immersion lens 20 shown in (a) in FIG. 6, the maximum outer diameter in the lowermost portion of the spherical lens top surface 21 is a maximum diameter $D_{L1}$ of the solid immersion lens 20. Further, the outer diameter of the lens bottom surface 22 optically connected to the sample S is a diameter $D_{L2}$ smaller than the maximum diameter. On the other hand, in the lens holder 30 shown in (b) in FIG. 6, in the lower side portion in which the solid immersion lens 20 is contained, the maximum diameter of the inner diameter is $D_{H1}$, and further, the minimum diameter in the lower opening 32 is $D_{H2}$. These diameters fulfill the following condition.

$D_{H1} > D_{L1} > D_{H2} > D_{L2}$

Fulfilling such a condition enables the lens holder 30 to preferably hold the solid immersion lens 20.

In this way, as the holder 30 and the solid immersion lens 20 are lowered with respect to the sample S by the supporting device 50 in a state in which the solid immersion lens 20 is held by the lens holder 30, as shown in (a) in FIG. 7, the bottom surface 22 of the solid immersion lens 20 comes into contact with the surface of the sample S at some point in time. As the holder 30 is lowered in this state, because the solid immersion lens 20 is not fixed to, but held by the holder 30, the solid immersion lens 20 is relatively pressed up against the holder 30 by the sample S to be separated from the annular protruding portion 33 of the holder 30 to be brought into a free state.

Further, as the holder 30 is further lowered, as shown in (b) in FIG. 7, the top surface 21 of the solid immersion lens 20 comes into one-point contact with the cover bottom surface 42 at the central point of the lens cover 40 at some point in time. At this time, as the force received by the solid immersion lens 20 from the lens cover 40 is shown with an arrow A, the solid immersion lens 20 is pressed against the sample S by the lens cover 40, thereby causing the solid immersion lens 20 and the sample S to adhere tightly to one another. Further, as shown by an arrow B, when the lens holder 30 is moved in the horizontal direction in this state, force in the horizontal direction is applied to the solid immersion lens 20 from the holder 30 to move the lens 20 while keeping the close contact state between the solid immersion lens 20 and the sample S, thereby it is possible to finely adjust its field of view.

When an attempt is made to further lower the lens holder 30 from this state, because the bottom surface 22 of the solid immersion lens 20 is in contact with the sample S, and the bottom surface 42 of the lens cover 40 is in contact with the solid immersion lens 20, the lens holder 30 is not further lowered, and then, as shown in FIG. 5, the movable table 55 of the linear guide fixed to the arm part slides along the guide main body 56. Thereby, only the force due to their own weight of the lens holder 30, the cover 40, the arm part, and the like is applied to the solid immersion lens 20, which prevents an excess of force from being applied to the lens 20 and the sample S.

Further, in such a configuration, as shown in FIG. 8, even when the sample S is tilted toward the lens holder 30 and the lens cover 40, force is applied to the solid immersion lens 20 so as to follow along the surface of the sample S by the lens cover 40 which is in one-point contact with the solid immersion lens 20. Thereby, even when the sample S is tilted, it is possible to cause the solid immersion lens 20 and the sample S to preferably come into close contact with one another.

FIG. 9 is a figure including diagrams showing point contact between the top surface 21 of the solid immersion lens 20 and the bottom surface of the lens cover. As shown in (b) in FIG. 9, for example, in the case of a configuration in which the bottom surface of a lens cover 90 is a curved surface shape, that comes into contact annularly with the top surface 21 of the solid immersion lens 20 at a plurality of points, the force F1 in a direction perpendicular to the lens top surface 21 in the force F0 applied to the solid immersion lens 20 when one point of the bottom surface of the lens cover 90 comes into contact first is balanced with the force applied to the solid immersion lens 20 from the sample S. On the other hand, a rotational moment is applied to the solid immersion lens 20 by the force F2 in a direction parallel to the lens top surface 21, which may bring down the solid immersion lens 20.

In contrast thereto, as shown in (a) in FIG. 9, with the configuration in which the bottom surface 42 of the lens cover 40 has a planar shape, that comes into one-point contact with the top surface 21 of the solid immersion lens 20 at its central point or in the vicinity thereof, the downward force F0 applied to the solid immersion lens 20 from the lens cover 40 and the force applied to the solid immersion lens 20 from the sample S are balanced with each other, which makes it possible to appropriately achieve close contact between the solid immersion lens 20 and the surface of the sample S.

An example of a specific configuration of the solid immersion lens 20 and the supporting device 50 according to the above-described embodiment will be described. As a material of the solid immersion lens 20, it is necessary to select a suitable material according to a wavelength of light to be observed. For example, quartz (wavelength: ultraviolet wavelength ~3 μm), glass (visible wavelength ~2.5 μm), silicon (1.2 μm~5 μm), gallium arsenide (900 nm~), gallium phosphide (650 nm~), germanium (2 μm~), and the like may be used as a lens material. In detail, for example, when heat generated in a semiconductor device is observed, silicon is suitably used as a lens material. Further, when light emission in a semiconductor device is observed, silicon, gallium arsenide, or gallium phosphide is suitably used as a lens material.

Further, as to the size of the solid immersion lens 20, for example, in the configuration shown in (b) in FIG. 3, the curvature radius of the spherical lens top surface 21 is R=6.46 mm, the maximum diameter is $D_{L1}$=ϕ10.4 mm (see FIG. 6), the outer diameter of the lens bottom surface 22 is $D_{L2}$=ϕ1.9 mm, and the lens height from the bottom surface 22 to the top surface 21 is 6.46 mm.

Further, as a material of the lens cover 40, in the above-described embodiment, basically, a material which does not allow passage of light is used in order to carry out positioning by observing an image of the positioning portion by its own shape itself of the lens cover 40. As such a cover material, for example, stainless steel, brass, tungsten, or the like may be cited. Further, as to the size of the lens cover 40, for example, the outer diameter of the annular portion 45 is ϕ20 mm, the inner diameter thereof is ϕ16 mm, the thickness of the cover 40 is 0.8 mm, and the width of the bar-shaped portion 47 is 0.3 mm or 0.5 mm.

Further, a distance between the lens top surface 21 of the solid immersion lens 20 and the cover bottom surface 42 of the lens cover 40 in a state in which the solid immersion lens 20 is in contact with the annular protruding portion 33 of the lens holder 30 is, for example, approximately 0.2 mm. Further, as to the size of the lens holder 30, a distance between the two sides facing each other in the octagonal outer shape of the lens holder 30 is, for example, approximately 24 mm.

Figure 10:
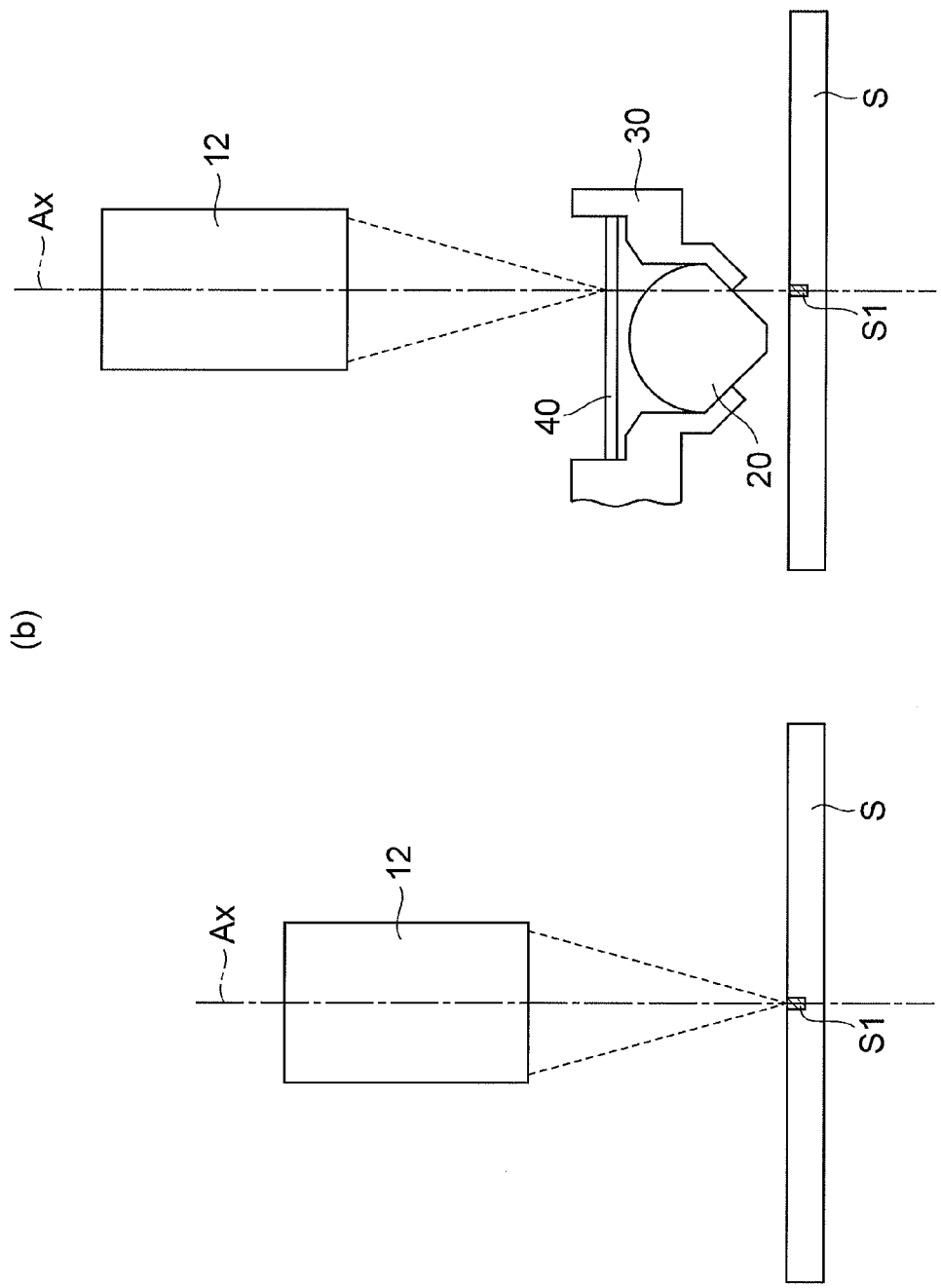
FIG. 10 is a figure including diagrams showing movement, installation, and positioning of the solid immersion lens.
Figure 11:
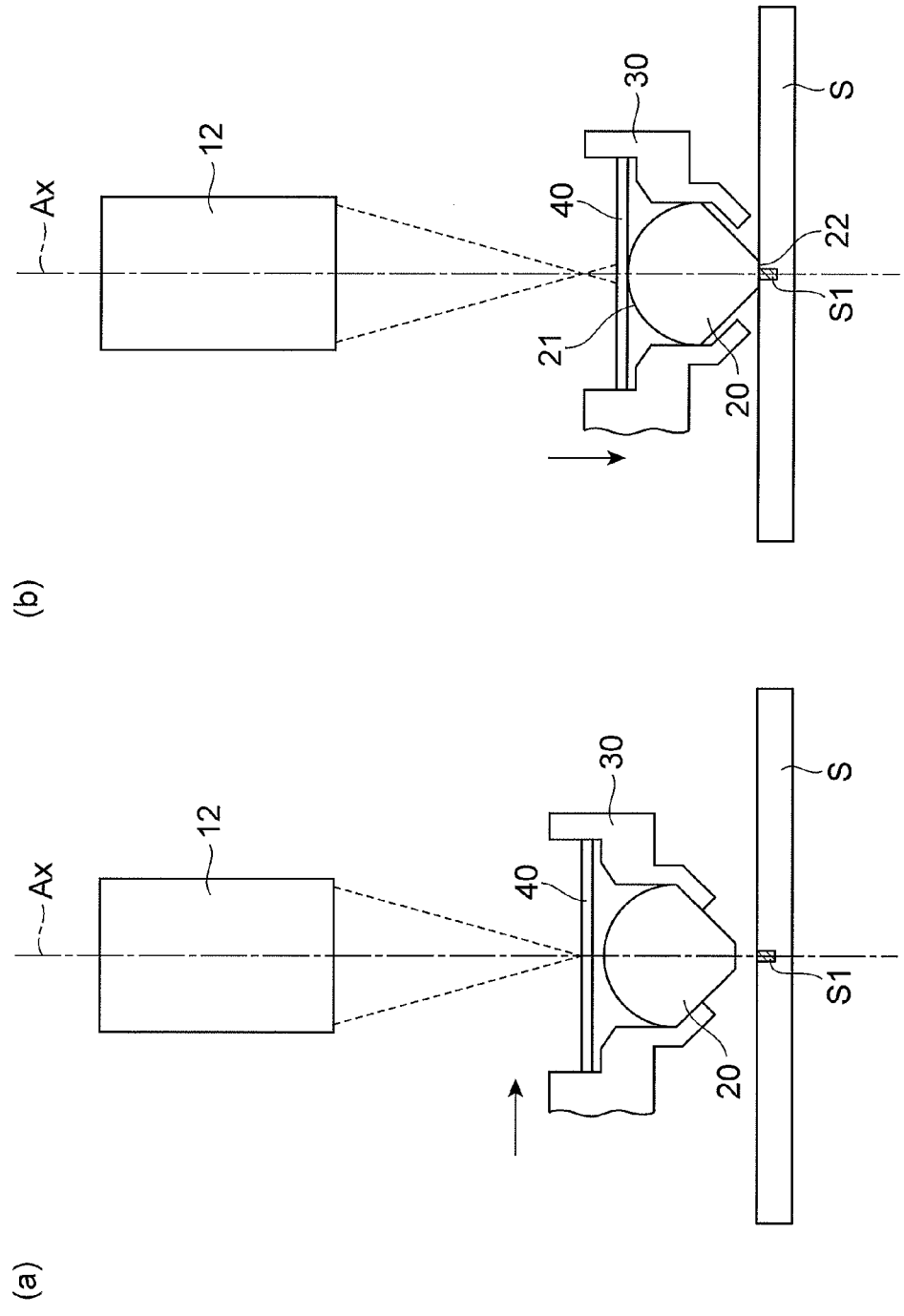
FIG. 11 is a figure including diagrams showing movement, installation, and positioning of the solid immersion lens.
Figure 12:
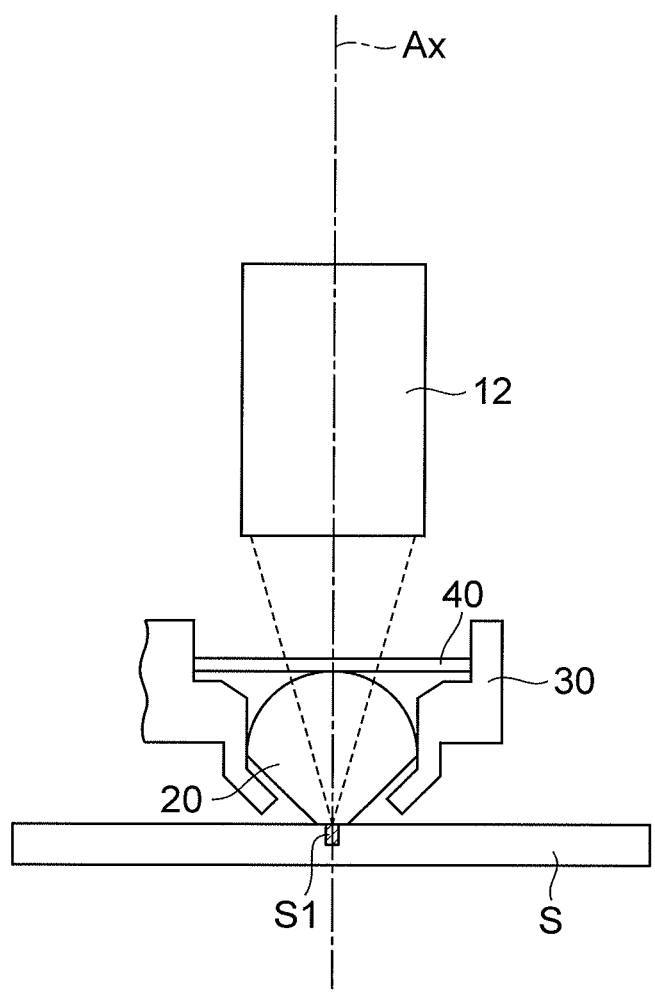
FIG. 12 is a diagram showing movement, installation, and positioning of the solid immersion lens.
Figure 15:
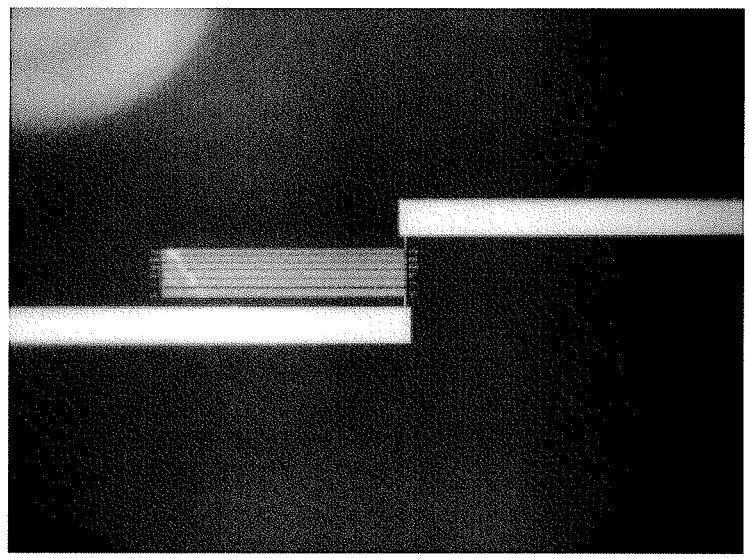
FIG. 15 is a diagram showing an example of an optical image observed via the objective lens.

For movement of the solid immersion lens 20 using the supporting device 50 with the above-described configuration, installation of the solid immersion lens 20 onto the sample S, and positioning of the solid immersion lens 20 with respect to the objective lens 12, one example of the specific operation method thereof will be described. FIG. 10 to FIG. 12 are diagrams showing movement, installation, and positioning of the solid immersion lens. Further, FIG. 13 to FIG. 15 are diagrams showing examples of optical images observed via the objective lens in movement, installation, and positioning of the solid immersion lens.

In the operation method according to the present example, first, as shown in (a) in FIG. 10, the objective lens 12 is driven with respect to the sample S by the XYZ stage in a state in which the solid immersion lens 20 is not installed between the objective lens 12 and the sample S. Thereby, an observation position is set such that an observation object position S1 on the sample S comes to the center of an image to be observed via the objective lens 12, and the focus of the objective lens 12 is adjusted on the sample S. At this time, as shown in (a) in FIG. 13, a two-dimensional optical image of the sample S is observed via the objective lens 12.

Next, as shown in (b) in FIG. 10, after the objective lens 12 is lifted up, the solid immersion lens 20 is moved in a direction perpendicular to the optical axis Ax by the solid immersion lens supporting device 50 to insert the solid immersion lens 20 into an approximate position between the objective lens 12 and the sample S. The movement and rough alignment of the solid immersion lens 20 may be carried out by, for example, manually moving the moving device 60 itself, to which the supporting device 50 is connected, on the support mount 82 (see FIG. 1). After the solid immersion lens 20 is inserted, the moving device 60 is fixed to the support mount 82 by adsorption or the like.

Further, in a state in which the solid immersion lens 20 is disposed at the approximate position in this way, the objective lens 12 is driven in the Z-axis direction to focus on the top surface of the lens cover 40 attached to the lens holder 30 that holds the solid immersion lens 20. At this time, as shown in (b) in FIG. 13, an image of the three bar-shaped portions 47 (see FIG. 3) serving as a positioning portion in the lens cover 40 is observed. Further, it is clear that, in this image, the pattern center of the positioning portion in the lens cover 40 is not on the image center, and the central axis of the solid immersion lens 20 is not on the optical axis of the objective lens 12.

Subsequently, as shown in (a) in FIG. 11, while referring to the image of the lens cover 40 observed via the objective lens 12 as is in the state in which the focus is set on the top surface of the lens cover 40, the solid immersion lens 20 is moved in the horizontal direction by the XY stage of the moving device 60 to carry out positioning of the solid immersion lens 20 with respect to the objective lens 12. Then, when the pattern center of the positioning portion in the lens cover 40 comes to the image center as shown in (a) in FIG. 14, it is judged that the solid immersion lens 20 is aligned with respect to the optical axis Ax of the objective lens 12.

When the positioning of the solid immersion lens 20 in the horizontal direction is completed, as shown in (b) in FIG. 11, the lens holder 30, the cover 40, and the solid immersion lens 20 are moved downward by the Z stage of the moving device 60. At this time, as shown in (b) in FIG. 14, as a result of out of focus by the objective lens 12, the image of the lens cover 40 gradually blurs. At a point in time when the solid immersion lens 20 is lowered to some extent, the bottom surface 22 of the solid immersion lens 20 comes into contact with the surface of the sample S to stop the downward movement of the solid immersion lens 20.

When the Z stage of the moving device 60 is further driven, the lens holder 30 and the cover 40 move downward in a state in which the solid immersion lens 20 is stationary on the sample S. Then, when the bottom surface of the lens cover 40 comes into one-point contact with the top surface 21 of the solid immersion lens 20, the solid immersion lens 20 is pressed against the sample S to be in a close contact state, and the downward movement of the lens holder 30 and the cover 40 is stopped. The stop of the lens holder 30 and the cover 40 can be confirmed at a point in time when a blurring level of the image stops changing (at a point in time when the state of out-of-focus stops changing) when a change of the image of the lens cover 40 is observed via the objective lens 12.

At this point in time, it is judged that the positioning of the solid immersion lens 20 with respect to the objective lens 12, the installation onto the sample S, and the close contact between the solid immersion lens 20 and the sample S are completed, the driving of the lens moving device 60 is stopped. In addition, the confirmation of a change of the image of the lens cover 40 and the driving of the moving device 60 can be carried out automatically or manually by an operator.

Finally, as shown in FIG. 12, the objective lens 12 is again moved downward by the Z stage, and the focus of the objective lens 12 is adjusted on the sample S. Thereby, a state is brought about in which, as shown in FIG. 15, it is possible to observe an enlarged image of the sample S via the objective lens 12 and the solid immersion lens 20. Further, as needed, a final fine adjustment of an observation position for the sample S is carried out by the XY stage of the moving device 60.

The configuration of the solid immersion lens supporting device according to the present invention will be further described.

FIG. 16 is a figure including (a) a top view and (b) a side cross-sectional view enlargedly showing another example of a configuration of the lens holder 30 and the lens cover 40 in the solid immersion lens supporting device 50. In addition, in FIG. 16, (a) in FIG. 16 shows a planar structure of only the lens cover 40 in the solid immersion lens supporting device 50. Further, (b) in FIG. 16 shows the structures of the lens holder 30 and the lens cover 40 and the structure of the solid immersion lens 20 supported by those together. In addition, in this configuration, the configurations of the solid immersion lens 20 and the lens holder 30 are the same as the configurations shown in FIG. 3.

The lens cover 40 is configured such that the cover bottom surface 42 on the solid immersion lens 20 side is on a plane perpendicular to the optical axis, and the cover bottom surface 42 comes into one-point contact with the lens top surface 21 of the solid immersion lens 20, preferably at the central point of the lens cover 40 or in the vicinity thereof. Further, with the configuration of FIG. 16, the cover top surface 41 as well is on a plane parallel to the bottom surface 42, thereby making the lens cover 40 become a flat plate-shaped member which is uniform in thickness.

In detail, the lens cover 40 is configured by a plate-shaped member 48 which is formed of a material allowing passage of light, and holds the solid immersion lens 20 between the lens holder 30 and the lens cover 40, and a positioning pattern portion 49 which is provided in a predetermined area of the plate-shaped member 48 to function as a positioning portion. The plate-shaped member 48 functions as a lens holding portion including the central point of the lens cover 40. Further, the positioning pattern portion 49 is preferably formed on the top surface 41 of the plate-shaped member 48 as shown in (b) in FIG. 16.

Further, in this configuration example, the positioning pattern portion 49 has a pattern similar to the positioning portion composed of the three bar-shaped portions 47 in the configuration example shown in FIG. 3. That is, the positioning pattern portion 49 is configured by three linear patterns extending radially and at even angular intervals outward from the central point of the lens cover 40. Further, in such a configuration, the positioning pattern portion 49 of the lens cover 40 composed of the three linear patterns is formed into a 3-fold rotationally symmetrical pattern centering on the central point of the lens cover 40 with respect to a plane perpendicular to the optical axis.

Further, in this configuration example, the annular fixing member 35 is configured to press the lens cover 40 from above and the side to hold the lens cover 40 installed on the annular step portion 34 of the lens holder 30.

In the configuration example shown in FIG. 16, as a specific configuration of the lens cover 40, a configuration in which the lens cover 40 has the plate-shaped member 48 which is formed of a material allowing passage of light, and holds the solid immersion lens 20 between the lens holder 30 and the lens cover 40, and the positioning pattern portion 49 which is provided in the plate-shaped member 48 to function as a positioning portion, is used. With such a configuration as well, it is possible to appropriately achieve the lens cover 40 having both of the function of holding the solid immersion lens 20 and the function as a positioning portion.

In this configuration example, the material, the size, and the like of the solid immersion lens 20 are the same as those described in the embodiment shown in FIG. 1 to FIG. 5. Further, as a material of the plate-shaped member 48 of the lens cover 40, because it is the configuration in which no opening portion is provided and the plate-shaped member 48 itself serves as a light passage portion, it is necessary to select a suitable material according to a wavelength of light to be observed in the same way as the solid immersion lens 20. For example, quartz (wavelength: ultraviolet wavelength ~3 µm), glass (visible wavelength ~2.5 µm), silicon (1.2 µm~5 µm), gallium arsenide (900 nm~), gallium phosphide (650 nm~), germanium (2 µm~), and the like may be used as a cover material. Further, as to the size of the lens cover 40, for example, the outer diameter of the disk shaped plate-shaped member 48 is φ17 mm, and the thickness thereof is 2 mm.

Further, with respect to the positioning pattern portion 49 provided in the plate-shaped member 48, for example, a pattern formed on the top surface 41 of the plate-shaped member 48 by metal evaporation, a pattern formed on the top surface 41 by scratching, or the like may be used. Alternatively, it may be a configuration in which the positioning pattern portion 49 is formed on the bottom surface 42 of the plate-shaped member 48, or inside the plate-shaped member 48.

Further, in the configurations of the lens cover 40 respectively shown in FIG. 3 and FIG. 16, as a specific configuration of the positioning portion provided in the lens cover 40, various configurations and patterns other than the configurations shown in FIG. 3 and FIG. 16 may be used.

Figure 17:
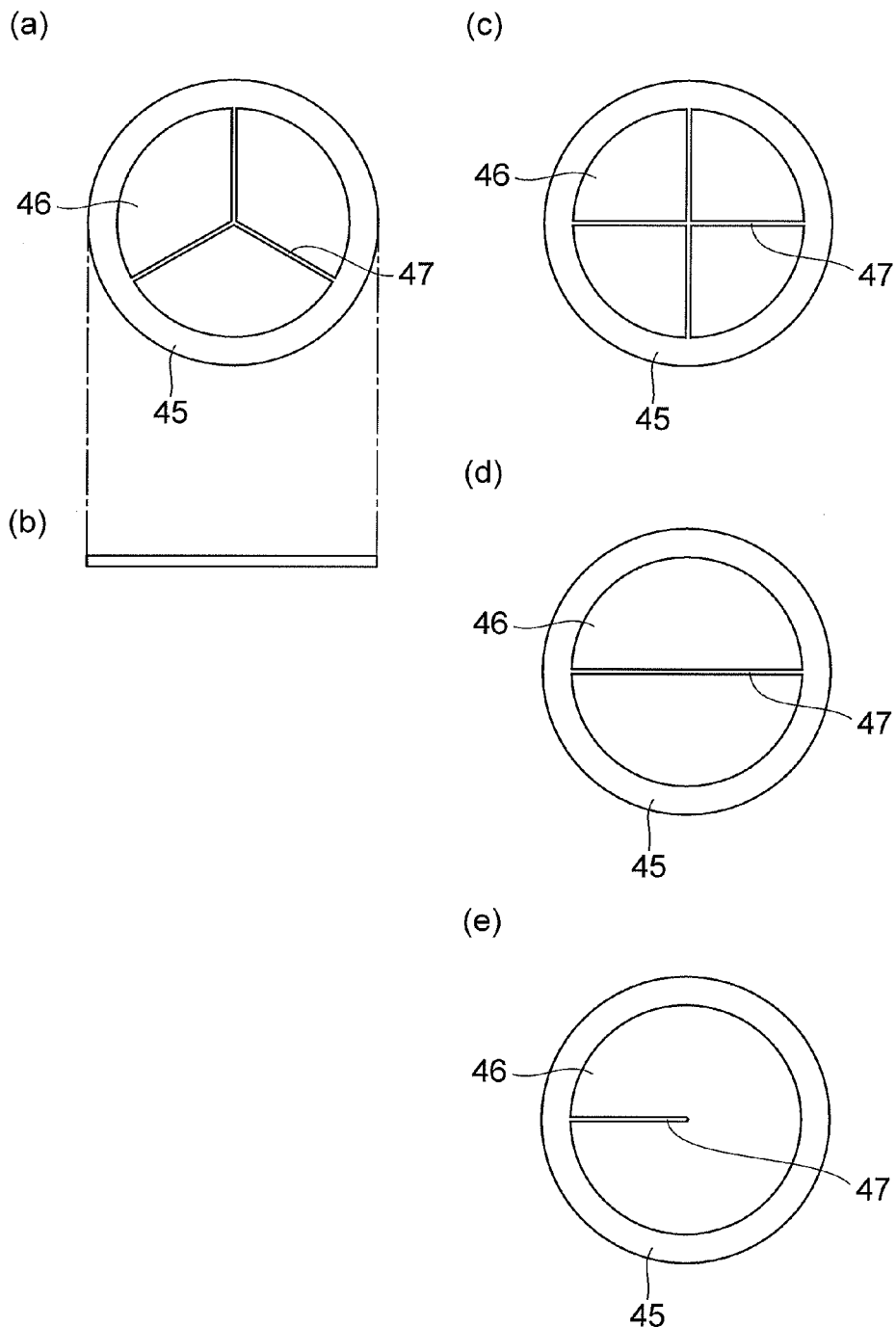
FIG. 17 is a figure including diagrams showing modified examples of a configuration of the lens cover shown in FIG. 3.

FIG. 17 is a figure including diagrams showing modified examples of the lens cover shown in FIG. 3. In FIG. 17, (a) in FIG. 17 is a top view showing a configuration of the lens cover having a positioning pattern which is the same as that of (a) in FIG. 3, and (b) in FIG. 17 is a side view thereof. Further, (c) to (e) in FIG. 17 are top views respectively showing modified examples of the lens cover.

In the configuration shown in (c) in FIG. 17, the lens cover is configured by the annular portion 45, four bar-shaped portions 47 extending radially and at intervals of 90° from the central point, and four opening portions 46. Further, in this configuration, the lens holding portion including the four bar-shaped portions 47 to function as a positioning portion has a pattern which is 4-fold rotationally symmetrical with respect to the central point. In the configuration shown in (d) in FIG. 17, the lens cover is configured by the annular portion 45, two bar-shaped portions 47 extending radially and at intervals of 180° from the central point, and two opening portions 46. Further, in this configuration, the lens holding portion including the two bar-shaped portions 47 to function as a positioning portion has a pattern which is 2-fold rotationally symmetrical (point-symmetrical) with respect to the central point.

In the configuration shown in (e) in FIG. 17, the lens cover is configured by the annular portion 45, a single bar-shaped portion 47 extending from the central point, and a single opening portion 46. The lens holding portion functioning as a positioning portion in the lens cover may use a configuration including only the single bar-shaped portion 47 in this way. However, from the standpoints of the application of force to the solid immersion lens 20 and the strength of the lens cover, as shown in (a), (c), and (d) in FIG. 17, the lens holding portion is preferably composed of two or more bar-shaped portions 47.

In addition, in a configuration in which the lens holding portion composed of a plurality of bar-shaped portions 47 is used as a positioning portion in this way, in order to bring the lens cover 40 and the solid immersion lens 20 into one-point contact and to hold the solid immersion lens 20 thereby, it is necessary for the lens holding portion functioning as a positioning portion to be formed into a pattern including at least the central point C of the lens cover 40.

Further, in such a configuration, the shape of the lens cover 40 is preferably set to an appropriate shape in view of a positioning accuracy of the solid immersion lens 20 using the positioning portion, ease of positioning, and an effect on image observation of the sample S due to a pattern of the positioning portion being provided in the lens cover 40. For example, in the configuration having the four bar-shaped portions 47 shown in (c) in FIG. 17, an area blocking light by the bar-shaped portions 47 is increased, and the number of partitions in an observation region in sample observation is increased. Therefore, an effect on an image of the sample S to be observed may be increased. Further, in the configurations of (d) and (e) in FIG. 17, the number of the bar-shaped portions 47 are few, which may not bring about satisfactory positioning accuracy. From this viewpoint, it is particularly preferable that the configuration composed of the three bar-shaped portions 47 shown in (a) in FIG. 3 and (a) in FIG. 17 be used.

On the other hand, FIG. 18 is a figure including diagrams showing modified examples of the lens cover shown in FIG. 16. In FIG. 18, (a) in FIG. 18 is a top view showing a configuration of the lens cover having a positioning pattern which is the same as that of (a) in FIG. 16, and (b) in FIG. 18 is a side view thereof. Further, (c) to (e) in FIG. 18 are top views respectively showing modified examples of the lens cover.

In the configuration shown in (c) in FIG. 18, the positioning pattern portion 49 provided in the plate-shaped member 48 allowing passage of light in the lens cover is configured by eight linear patterns extending radially and at intervals of 45° from the central point. In the configuration shown in (d) in FIG. 18, the positioning pattern portion 49 provided in the plate-shaped member 48 in the lens cover is configured by a plurality of concentric annular patterns. Such a concentric pattern is effective in the configuration in which the positioning pattern portion 49 is formed in the plate-shaped member 48 allowing passage of light.

In the configuration shown in (e) in FIG. 18, the positioning pattern portion 49 provided in the plate-shaped member 48 in the lens cover is configured by a crisscross pattern provided centering on the central point of the lens cover. In this way, various shapes and patterns of the positioning pattern portion 49 of the lens cover can be used.

Here, in the configuration in which the positioning pattern portion 49 is provided in the plate-shaped member 48 allowing passage of light, this plate-shaped member 48 itself has a function as a lens holding portion including the central point C of the lens cover 40. Therefore, there is no need for the positioning pattern portion 49 used as a positioning portion to include the central point C of the lens cover 40, and the positioning portion has a high degree of freedom in shape and pattern. However, it is necessary to pay attention to the possibility of generating an aberration in sample observation due to the thickness of the plate-shaped member 48. Further, it is necessary to change the material of the plate-shaped member 48 according to a wavelength of light to be observed because light passes through the plate-shaped member 48.

The immersion lens supporting device according to the present invention is not limited to the above-described embodiments and configuration examples, and various modifications are possible. For example, in detail, the entire configuration of the solid immersion lens supporting device 50 including the lens holder 30, the cover 40, and the arm parts 51 and 52 is not limited to the configuration shown in FIG. 1 and FIG. 2, and various configurations may be used. Further, the configuration of the positioning portion in the lens cover 40 is not limited to the configurations shown in FIG. 3 and FIG. 16 to FIG. 18, and positioning portions having various patterns may be used as long as it is possible to carry out positioning of the solid immersion lens 20 with respect to the objective lens 12.

Further, when an arm part extending outward is provided to the lens holder 30, a specific configuration of the arm part is not limited to the configuration in which the arm part is divided into the first and second arm parts 51 and 52 shown in FIG. 1, and various configurations such as a configuration using a single arm part may be used. Further, the immersion lens is not limited to the solid immersion lens as described above, and the immersion lens supporting device with the above-described configuration may be applied to, for example, a liquid immersion lens in the same way.

The immersion lens supporting device according to the above-described embodiment is a supporting device which supports an immersion lens movably in a direction perpendicular to an optical axis of an objective lens between the objective lens and a sample serving as an observation object, the supporting device including (1) a lens holder that holds the immersion lens in a free state in which a lens bottom surface protrudes downward through a lower opening so as not to fix the immersion lens, and (2) a lens cover which is provided to an upper opening of the lens holder, and in which a cover bottom surface on the immersion lens side is on a plane perpendicular to the optical axis, the lens cover coming into one-point contact with a spherical lens top surface of the immersion lens, wherein (3) the lens cover is provided with a positioning portion which is capable of carrying out positioning of the immersion lens with respect to the objective lens, with reference to an image of the lens cover observed via the objective lens.

In the supporting device with the above-described configuration, the positioning portion provided in the lens cover is preferably formed into a pattern which is n-fold rotationally symmetrical (n is an integer of 2 or more) centering on the central point of the lens cover with respect to a plane perpendicular to the optical axis. By using the positioning portion having such a symmetrical pattern, it is possible to accurately carry out positioning of the immersion lens by using an image of the lens cover.

As a specific configuration of the lens cover, the lens cover may use a configuration in which one or a plurality of opening portions allowing passage of light, and a lens holding portion which is formed into a pattern including the central point of the lens cover, and which holds the immersion lens between the lens holder and the lens cover, and functions as the positioning portion are provided. In this case, the lens holding portion preferably has a plurality of bar-shaped portions extending radially and at even intervals from the central point of the lens cover.

Alternatively, as another specific configuration of the lens cover, the lens cover may use a configuration in which a plate-shaped member which is formed of a material allowing passage of light, and which holds the immersion lens between the lens holder and the lens cover, and a positioning pattern portion which is provided in the plate-shaped member to function as the positioning portion are provided. In this case, the positioning pattern portion is preferably formed into a concentric pattern.

Further, the supporting device preferably includes an arm part which extends outward from the lens holder, and is connected to a moving device for moving the immersion lens in a direction perpendicular to the optical axis of the objective lens. With such a configuration, it is possible to appropriately carry out holding and movement of the immersion lens between the objective lens and the sample.

Further, in a configuration having an arm part in this way, a configuration in which the arm part is connected to the moving device via a linear movement guide which is slidable in a direction along the optical axis, may be used. With such a configuration, as needed, the arm part, and the lens holder and the lens cover which are fixed to the arm part slide in a direction along the optical axis, thereby preventing an excess of force from being applied to the lens and the sample when the immersion lens is installed onto the sample.

Further, the arm part may have a configuration in which a weight attaching portion allowing attachment of a weight is provided. In this case, when the immersion lens is installed onto the sample, it is possible to adjust the load applied to the lens and the sample and the close contact state between the lens and the sample due to the load by attachment of the weight.

INDUSTRIAL APPLICABILITY

The present invention can be utilized as an immersion lens supporting device which is capable of efficiently carrying out movement and installation of an immersion lens onto a sample, and positioning of the immersion lens with respect to the objective lens.

Reference Signs List

1A—microscope system, 10—microscope optical system, 12 to 15—objective lens, 20—solid immersion lens, 21—lens top surface, 22—lens bottom surface, 23—lens side surface, 30—lens holder, 31—upper opening, 32—lower opening, 33—annular protruding portion, 34—annular step portion, 35—fixing member, 36—screw hole, 40—lens cover, 41—cover top surface, 42—cover bottom surface, 45—annular portion, 46—opening portion, 47—bar-shaped portion, 48—plate-shaped member, 49—positioning pattern portion, 50—solid immersion lens supporting device, 51—first arm part, 51a—fixing screw, 52—second arm part, 53—connecting portion, 54—linear movement guide (linear guide), 55—movable table, 56—guide main body, 57—weight attaching portion, 58—weight, 60—lens moving device (XYZ stage), 80—support mount, 81—first support mount, 82—second support mount.

The invention claimed is:

1. An immersion lens supporting device for supporting an immersion lens movably in a direction perpendicular to an optical axis of an objective lens between the objective lens and a sample of an observation object, the supporting device comprising:
   an immersion lens:
   a lens holder having a lower opening and an upper opening and holding the immersion lens in a free state in which a lens bottom surface protrudes downward through the lower opening so as not to fix the immersion lens; and
   a lens cover which is provided for the upper opening of the lens holder so as to cover the upper opening, the lens cover being located above the immersion lens so that the immersion lens is held in a space sandwiched between the lens holder and the lens cover, wherein,
   a cover bottom surface of the lens cover on the immersion lens side is a planar surface disposed on a plane perpendicular to the optical axis, and the lens cover is configured such that, when the lens cover comes into contact with the immersion lens, the cover bottom surface comes into one-point contact with a spherical lens top surface of the immersion lens, and
   wherein
   the lens cover is provided with a positioning portion having a predetermined pattern which is capable of carrying out positioning of the immersion lens with respect to the objective lens, with reference to an image of the positioning portion of the lens cover observed via the objective lens.

2. The immersion lens supporting device according to claim 1, wherein the positioning portion in the lens cover is formed into a pattern which is n-fold rotationally symmetrical (n is an integer not less than 2) centering on the central point of the lens cover with respect to the plane perpendicular to the optical axis.

3. The immersion lens supporting device according to claim 1, wherein the lens cover has
   one or a plurality of opening portions allowing passage of light, and
   a lens holding portion which is formed into a pattern including the central point of the lens cover, the lens holding portion holding the immersion lens between the lens holder and the lens cover, and functioning as the positioning portion.

4. The immersion lens supporting device according to claim 3, wherein the lens holding portion has a plurality of bar-shaped portions extending radially and at even intervals from the central point of the lens cover.

5. The immersion lens supporting device according to claim 1, wherein the lens cover has
   a plate-shaped member which is formed of a material allowing passage of light, and which holds the immersion lens between the lens holder and the lens cover, and
   a positioning pattern portion which is provided in the plate-shaped member to function as the positioning portion.

6. The immersion lens supporting device according to claim 5, wherein the positioning pattern portion is formed into a concentric pattern.

7. The immersion lens supporting device according to claim 1, further comprising an arm part which extends outward from the lens holder, and is connected to a moving device for moving the immersion lens in a direction perpendicular to the optical axis of the objective lens.

8. The immersion lens supporting device according to claim 7, wherein the arm part is connected to the moving device via a linear movement guide which is slidable in a direction along the optical axis.

9. The immersion lens supporting device according to claim 7, wherein the arm part has a weight attaching portion allowing attachment of a weight.

* * * * *